(12) United States Patent
Budiman et al.

(10) Patent No.: US 9,396,755 B2
(45) Date of Patent: Jul. 19, 2016

(54) TEMPERATURE-DEFINED DATA-STORAGE POLICY FOR A HYBRID DISK DRIVE

(71) Applicant: Kabushiki Kaisha Toshiba, Tokyo (JP)

(72) Inventors: Mine Wonkyung Budiman, Livermore, CA (US); Thorsten Schmidt, Livermore, CA (US); Richard M. Ehrlich, Saratoga, CA (US); Eric R. Dunn, Cupertino, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/772,143

(22) Filed: Feb. 20, 2013

(65) Prior Publication Data
US 2014/0233132 A1 Aug. 21, 2014

(51) Int. Cl.
G11B 5/02 (2006.01)
G11B 20/10 (2006.01)
G11B 5/55 (2006.01)
G11B 19/04 (2006.01)

(52) U.S. Cl.
CPC ........ G11B 20/10527 (2013.01); G11B 5/5565 (2013.01); G11B 19/046 (2013.01); G11B 2020/10833 (2013.01)

(58) Field of Classification Search
CPC .... G11B 5/5565; G11B 19/046; G11B 20/00; G11B 2020/10833
USPC ............... 360/55, 71; 711/104, 113, 118, 135
See application file for complete search history.

(56) References Cited

U.S. PATENT DOCUMENTS

| 7,184,313 B2 | 2/2007 | Betser et al. |
| 7,411,757 B2 | 8/2008 | Chu et al. |
| 8,189,283 B2 * | 5/2012 | Colligan ................ G11B 15/18 360/69 |
| 8,612,677 B1 * | 12/2013 | Motegi ................ G06F 11/3037 369/53.42 |
| 2005/0068653 A1 * | 3/2005 | Escobar ................... G11B 5/40 360/51 |
| 2008/0007681 A1 * | 1/2008 | Chen ................. G02F 1/133707 349/129 |
| 2008/0007861 A1 * | 1/2008 | Park et al. ....................... 360/75 |
| 2008/0024899 A1 * | 1/2008 | Chu ...................... G06F 3/0614 360/69 |
| 2008/0068755 A1 * | 3/2008 | Aoyagi ................ G11B 25/043 360/137 |
| 2008/0104308 A1 * | 5/2008 | Mo ..................... G06F 12/0246 711/103 |
| 2008/0123217 A1 * | 5/2008 | Ishii ......................... G11B 5/02 360/78.04 |
| 2008/0130156 A1 * | 6/2008 | Chu ........................ G11B 20/18 360/71 |
| 2008/0186609 A1 * | 8/2008 | Akiba ..................... G11B 27/36 360/31 |
| 2009/0195921 A1 * | 8/2009 | Kim ..................... G11B 33/144 360/97.12 |
| 2010/0053788 A1 * | 3/2010 | Uno ...................... G11B 5/6029 360/31 |
| 2012/0016533 A1 * | 1/2012 | Lim ........................ G06F 1/206 700/300 |
| 2014/0078611 A1 * | 3/2014 | Powell ................. G11B 25/043 360/73.03 |

* cited by examiner

Primary Examiner — Thomas Alunkal
(74) Attorney, Agent, or Firm — Patterson & Sheridan, LLP

(57) ABSTRACT

Data is stored in a hybrid drive that includes a magnetic storage medium and a non-volatile solid-state device using a temperature-defined data-storage policy. According to the temperature-defined data storage policy, the drive can perform operations for modulating the temperature of the drive, minimizing increased wear on memory cells in the non-volatile solid-state device, and/or preventing data stored in the non-volatile solid-state device from being lost.

8 Claims, 4 Drawing Sheets

TEMPERATURE-DEFINED DATA-STORAGE POLICY FOR A HYBRID DISK DRIVE

BACKGROUND

1. Field

Embodiments described herein relate generally to data storage units, systems and methods for storing data in a hybrid disk drive.

2. Description of the Related Art

Hybrid hard disk drives (HDDs) include one or more rotating magnetic disks combined with non-volatile solid-state (e.g., flash) memory. Generally, a hybrid HDD has both the capacity of a conventional HDD and the ability to access data as quickly as a solid-state drive, and for this reason hybrid drives are expected to be commonly used in laptop computers.

However, the solid-state memory in hybrid drives generally suffers from the same sensitivity to high and low temperatures as that associated with solid-state drives. For example, memory cells in NAND-based solid-state drives are only operable for a limited number of program/erase cycles, and this number is greatly reduced when program/erase cycles are performed extensively at low temperatures. Thus, operation of a hybrid drive at temperatures lower than the optimal operating temperature range of the NAND memory can undesirably shorten the useful life of the NAND portion of the drive. Furthermore, at higher temperatures, data retention of NAND memory cells is greatly reduced. At very high temperatures, for example when a solid-state drive is greater than 60 to 80° C., even short-term retention of data of NAND memory cells may become unreliable, and the NAND memory cells cannot be considered a dependable non-volatile data storage medium. This is because, in such situations, data stored in NAND memory cells may be lost at anytime. So while hybrid drives can incorporate some of the advantages of solid-state drives, hybrid drives also have some of the same shortcomings.

SUMMARY

One or more embodiments provide systems and methods for storing data in a hybrid drive that includes a magnetic storage medium and a non-volatile solid-state device. During operation, detection of a hybrid drive temperature that is higher or lower than a normal desired operating range of the hybrid drive initiates implementation of a temperature-defined data-storage policy. According to the temperature-defined data-storage policy, the drive perform operations for modulating the temperature of the drive, minimizing increased wear on memory cells in the non-volatile solid-state device, and/or preventing data stored in the non-volatile solid-state device from being lost.

A data storage device, according to embodiments, comprises a magnetic storage medium, a non-volatile solid-state device, and a controller. In one embodiment, the controller is configured to detect a temperature of the data storage device that is outside of a predetermined temperature range, and execute a write command received by the data storage device by writing data associated with the write command to the magnetic drive based on a detected temperature. In another embodiment, the controller is configured to detect a temperature of the data storage device that is lower than a predetermined temperature, and increment a program/erase cycle counter for the memory block by a temperature-dependent factor for each program/erase cycle experienced by the memory block based on a detected temperature. In still another embodiment, the controller is configured to detect a temperature of the data storage device that is outside of a predetermined temperature range, and change a rate of data transfer to the data storage device based on the detected temperature.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
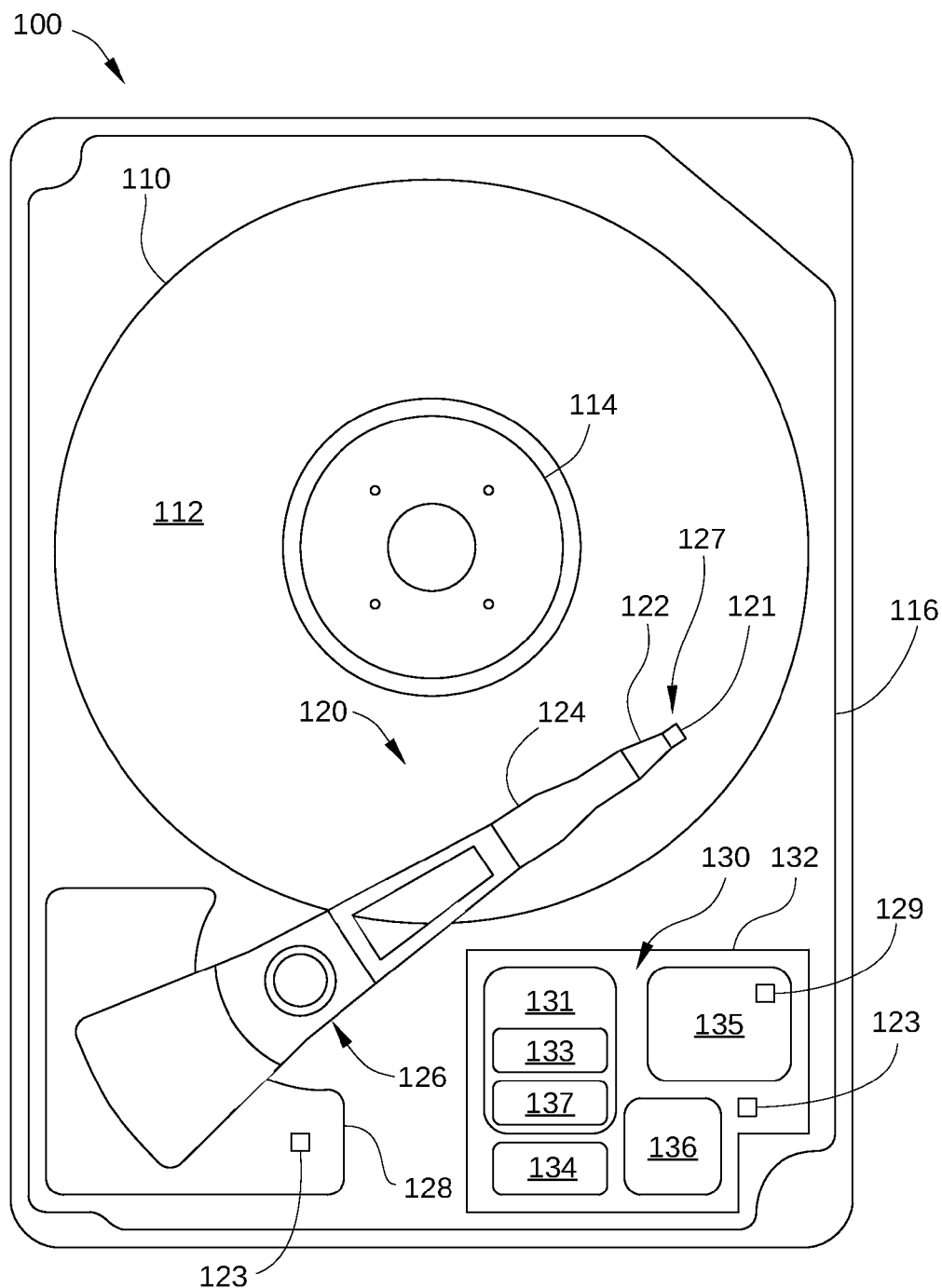
FIG. 1 is a schematic view of an exemplary disk drive, according to one embodiment.

FIG. 1 is a schematic view of an exemplary disk drive, according to one embodiment. For clarity, hybrid drive 100 is illustrated without a top cover. Hybrid drive 100 includes at least one storage disk 110 that is rotated by a spindle motor 114 and includes a plurality of concentric data storage tracks. Spindle motor 114 is mounted on a base plate 116. An actuator arm assembly 120 is also mounted on base plate 116, and has a slider 121 mounted on a flexure arm 122 with a read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over the desired concentric data storage track disposed on the surface 112 of storage disk 110. Spindle motor 114, read/write head 127, and voice coil motor 128 are coupled to electronic circuits 130, which are mounted on a printed circuit board 132. Electronic circuits 130 include a read/write channel 137, a microprocessor-based controller 133, random-access memory (RAM) 134 (which may be a dynamic RAM and is used as a data buffer), and/or a flash memory device 135 and flash manager device 136. In some embodiments, flash manager device 136, read/write channel 137, and/or microprocessor-based controller 133 are included in a single chip, such as a system-on-chip 131. In some embodiments, hybrid drive 100 may further include a motor-driver chip 125 (also commonly referred to as a power-chip or a combo-chip), which accepts commands from microprocessor-based controller 133 and drives both spindle motor 114 and voice coil motor 128. Also, in some embodiments, flash memory device 135 may include one or more heating elements 129, such as miniature resistive heating elements.

Hybrid drive 100 also includes one or more temperature sensors 123, for example, thermistors, configured for detecting temperatures in hybrid drive 100 and reporting said temperatures to controller 133. In FIG. 1, temperature sensors 123 are mounted proximate flash memory device 135 and voice coil motor 128, but in other embodiments, one or more temperature sensors 123 may be located in different and/or additional locations in hybrid drive 100.

For clarity, hybrid drive 100 is illustrated with a single storage disk 110 and a single actuator arm assembly 120. Hybrid drive 100 may also include multiple storage disks and multiple actuator arm assemblies. In addition, each side of storage disk 110 may have an associated read/write head coupled to a flexure arm.

When data are transferred to or from storage disk 110, actuator arm assembly 120 sweeps an arc between an inner diameter (ID) and an outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

Hybrid drive 100 is configured as a hybrid drive, and in normal operation data can be stored to and retrieved from storage disk 110 and/or flash memory device 135. In a hybrid drive, non-volatile memory, such as flash memory device 135, supplements the spinning storage disk 110 to provide faster boot, hibernate, resume and other data read-write operations, as well as lower power consumption. Such a hybrid drive configuration is particularly advantageous for battery operated computer systems, such as mobile computers or other mobile computing devices. In a preferred embodiment, flash memory device is a non-volatile solid state storage medium, such as a NAND flash chip that can be electrically erased and reprogrammed, and is sized to supplement storage disk 110 in hybrid drive 100 as a non-volatile storage medium. For example, in some embodiments, flash memory device 135 has data storage capacity that is orders of magnitude larger than RAM 134, e.g., gigabytes (GB) vs. megabytes (MB).

Figure 2:
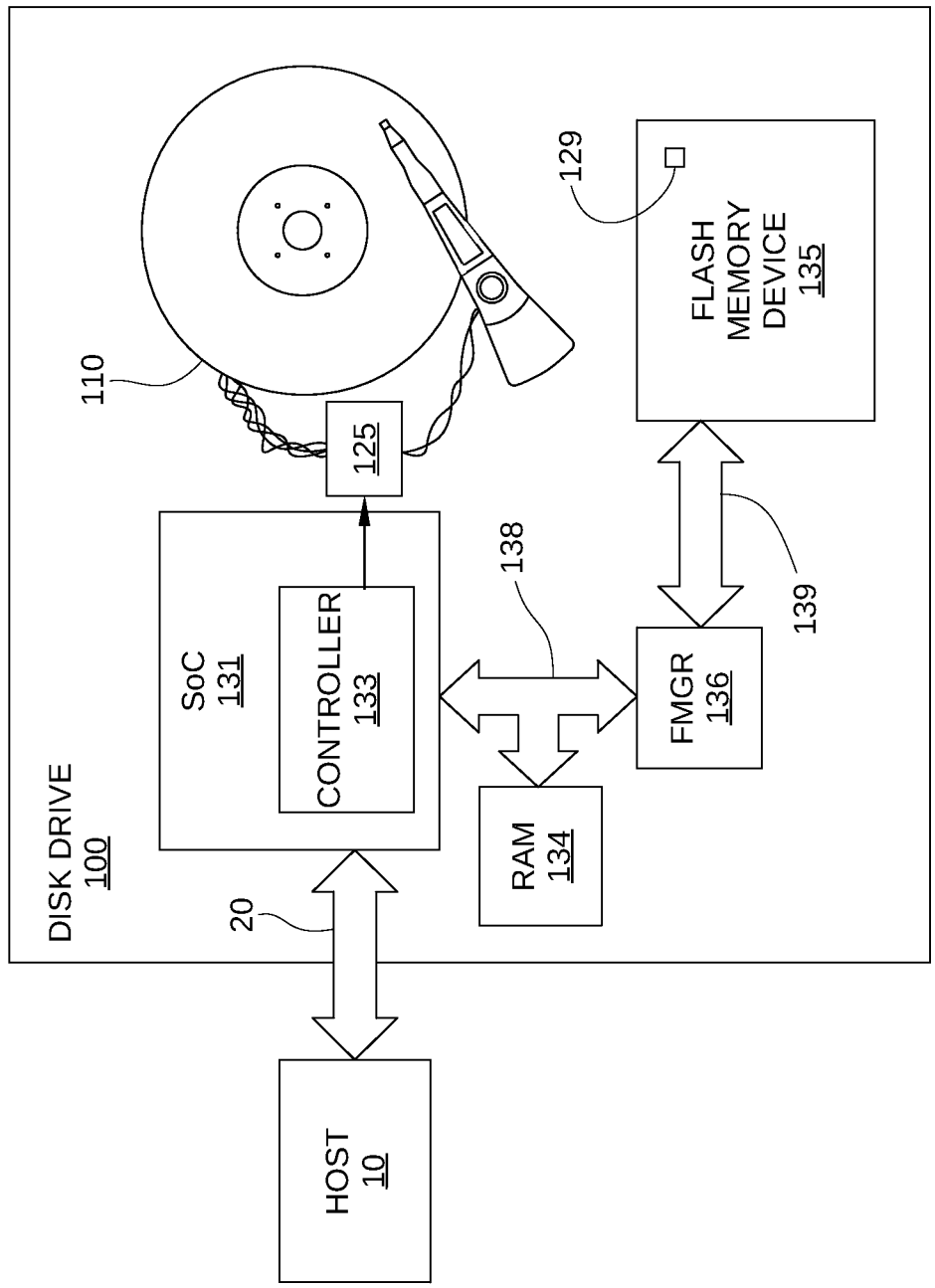
FIG. 2 illustrates an operational diagram of a hybrid drive with elements of electronic circuits shown configured to one embodiment.

FIG. 2 illustrates an operational diagram of hybrid drive 100 with elements of electronic circuits 130 shown configured according to one embodiment. As shown, hybrid drive 100 includes RAM 134, flash memory device 135, a flash manager device 136, system-on-chip 131, and a high-speed data path 138. Hybrid drive 100 is connected to a host 10, such as a host computer, via a host interface 20, such as a serial advanced technology attachment (SATA) bus.

In the embodiment illustrated in FIG. 2, flash manager device 136 controls interfacing of flash memory device 135 with high-speed data path 138 and is connected to flash memory device 135 via a NAND interface bus 139. System-on-chip 131 includes microprocessor-based controller 133 and other hardware (including read/write channel 137) for controlling operation of hybrid drive 100, and is connected to RAM 134 and flash manager device 136 via high-speed data path 138. Microprocessor-based controller 133 is a control unit that may include a microcontroller such as an ARM microprocessor, a hybrid drive controller, and any control circuitry within hybrid drive 100. High-speed data path 138 is a high-speed bus known in the art, such as a double data rate (DDR) bus, a DDR2 bus, a DDR3 bus, or the like.

In general, data transferred to flash memory device 135 may be write data accepted directly from host 10 as part of a write request or as data read from storage disk 110 as part of a read request. When data are transferred to high-density NAND-type devices in flash memory device 135, the data are written to blocks of NAND memory that have been erased previously; if insufficient erased blocks are present in flash memory device 135, additional memory blocks must first be erased before the desired data are transferred to flash memory device 135. These additional memory blocks may be data blocks that are currently storing "dirty" data, which is data that is only stored in flash memory device 135, or "non-dirty" data, which is data that is a copy of corresponding data already stored on storage disk 110.

As noted previously, memory cells in flash memory device 135, particularly when NAND-type memory cells, suffer increased wear when data are written thereto at low temperatures, e.g., 10° C. or less. Generally, this increase in wear is worse at colder temperatures, and can be as much as an order of magnitude or more than writing to a solid-state memory cell at a normal operating temperature. For example, at 0° C., the degradation experienced by a solid-state memory cell in a single program/erase (P/E) cycle may be as much as 10 or 20 times that experienced by the memory cell while at a normal operating temperature, i.e., between 20 and 60° C. Consequently, the useful lifetime of flash memory device 135 can be greatly reduced when operated extensively at low temperatures.

To level the wear accrued by the memory cells in a flash memory device, P/E cycles are typically tracked for each block of memory cells in the flash memory device. However, because wear caused by a P/E cycle can vary significantly at lower temperatures, the accuracy of such tracking can be poor. Thus, to avoid memory cells in a flash memory device unexpectedly failing due to inaccurately tracked wear, a hybrid drive may assume a certain percentage of use by the drive at lower than normal temperatures and/or include a "cushion" in the estimated number of P/E cycles each memory cell can experience. Unfortunately, either of these approaches reduces the useful life of the flash memory device, even when memory cells therein are still operable. Furthermore, when actual low-temperature use of a flash memory device exceeds the assumed low-temperature use, unexpected failures of memory cells can still occur. In light of the above, according to some embodiments, wear accrued by memory cells in a flash memory device is tracked more accurately by using a temperature-dependent factor for each program/erase cycle experienced by a memory block. One such embodiment is described below in conjunction with FIG. 3.

Figure 3:
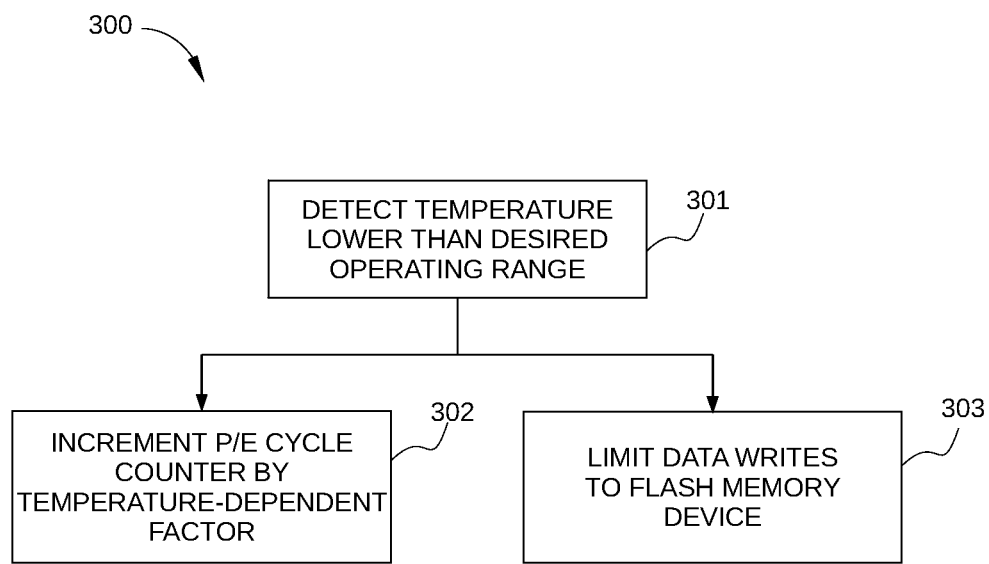
FIG. 3 sets forth a flowchart of method steps for storing data in a data storage device that includes a magnetic drive and a non-volatile solid-state drive, according to one or more embodiments.

FIG. 3 sets forth a flowchart of method steps for storing data in a data storage device, such as hybrid drive 100, that includes a magnetic drive and a non-volatile solid-state drive, according to one or more embodiments. Although the method steps are described in conjunction with hybrid drive 100 in FIGS. 1 and 2, persons skilled in the art will understand that method 300 may be performed with other types of systems. The control algorithms for method 300 may reside in and/or be performed by controller 133, flash manager device 136, host 10, or any other suitable control circuit or system.

As shown, method 300 begins at step 301, where controller 133 or other suitable control circuit or system detects a temperature of hybrid drive 100 that is less than a predetermined normal operating temperature range for hybrid drive 100. In some embodiments, the temperature detected may be a measured operating temperature for hybrid drive 100 as a whole, and in other embodiments, the temperature detected may be specific to flash memory device 135. For example, in some embodiments said temperature may be detected by temperature sensors 123 and/or other thermistors disposed inside hybrid drive 100, e.g., mounted proximate voice coil motor 128, printed circuit board 132, etc. Alternatively, the temperature detected in step 301 may be measured by a thermistor or other temperature-sensing device disposed on or formed as a part of flash memory device 135, and may be configured to specifically report the current temperature of flash memory device 135.

A normal operating temperature range for hybrid drive 100, or, alternatively flash memory device 135, is typically optimized for about 40° C., which is an average temperature for an operating electronic device in 25° C. ambient conditions. Thus, a desirable operating temperature range may be 20° C. to 60° C. An alternative desirable operating temperature range may be 10° C. to 70° C. Other desirable operating temperature ranges also fall within the scope of the invention. Generally, the minimum desired operating temperature of the desired operating temperature range coincides with a temperature at which wear caused by programming memory cells is significantly higher than under normal conditions. In some embodiments, "significantly higher" wear may be defined as approximately twice that of normal wear associated with a P/E cycle. In other embodiments, "significantly higher" wear may be defined as 50% more wear than normally associated with a P/E cycle. Of course, any other level of increased wear relative to normal P/E cycle wear may be used to define a minimum desired operating temperature for hybrid drive 100 or flash memory device 135 without exceeding the scope of the invention.

In step 302, controller 133 or other suitable control circuit or system increments a P/E cycle counter for memory blocks in flash memory device 135 by a temperature-dependent factor for each P/E cycle experienced by a memory block. The P/E cycle counter may be an element of controller 133 or other circuitry or firmware associated with hybrid drive 100. Step 302 is performed in response to step 301, i.e., detecting that hybrid drive 100 or flash memory device 135 is at a temperature that is below a predetermined minimum desired operating temperature. As noted above, the predetermined minimum desired operating temperature can vary based on the temperature at which significantly higher wear is considered to occur.

Furthermore, use of a temperature-dependent factor for incrementing a P/E cycle counter for memory blocks in flash memory device 135 is not limited to instances in which hybrid drive 100 or flash memory device 135 are below a predetermined minimum desired operating temperature. In some embodiments, such a temperature-dependent factor for incrementing a P/E cycle counter may be used across the entire operating temperature range of hybrid drive 100 or over any portion of the operating temperature range of hybrid drive 100. For instance, at higher temperatures, the temperature-dependent factor for incrementing a P/E cycle counter may have a value of less than 1.

In step 302, when a memory block in flash memory device 135 undergoes a P/E cycle, the P/E cycle counter for the memory block is incremented by the temperature-dependent factor rather than by one. Thus, the increased wear on memory blocks in flash memory device 135 is accurately tracked, thereby avoiding unexpected failures of memory cells without arbitrarily shortening the useful lifetime of flash memory device 135. In some embodiments, the temperature-dependent factor is a function of the temperature detected in step 301. For example, the temperature-dependent factor may be an integral value that increases as the temperature detected in step 301 decreases. Alternatively, the temperature-dependent factor may vary in smaller or larger increments than integral values. In either case, the increased wear associated with writing data to flash memory device 135 at low temperatures can be accurately tracked, thereby maximizing the useful lifetime of flash memory device 135 while minimizing the potential for memory cells therein unexpectedly failing to wear.

In some embodiments, wear associated with operating flash memory device 135 at low temperatures is reduced by altering the operation of hybrid drive 100 by limiting how much data is written to flash memory device 135 when below a desired operating temperature. One such embodiment is illustrated in step 303 of FIG. 3, which in some embodiments may be performed in response to step 301, as shown in FIG. 3.

In step 303, controller 133 or other suitable control circuit or system limits data writes to flash memory device 135, since the operating temperature of hybrid drive 100 or flash memory device 135 is detected in step 301 to be lower than a desired minimum operating temperature. In some embodiments, writes are reduced to flash memory device 135, but are still allowed for write commands that have a relatively high priority. For example, in some embodiments, garbage collection activities in flash memory device can be restricted until such time that hybrid device 100 and/or flash memory device 135 are detected to be in a desired temperature range. In another example, when host 10 enters a hibernation mode, even though hybrid drive and/or flash memory device 135 may be lower than a desired minimum operating temperature, controller 133 may allow the hibernation-file to be written to flash memory device 135, so that read/write head 127 can be safely parked. Parking read/write head 127 when entering hibernation mode protects read/write head 127 from mechanical damage if the user begins to move host device 10 immediately after ordering hibernation. Because quickly parking read/write head 127 in this situation is highly beneficial, controller 133 may be configured to write data to flash memory device 135 even though more wear thereto may result than under typical conditions.

In some embodiments, all or substantially all writes to flash memory device 135 are refused, for example when the operating temperature of hybrid drive 100 and/or flash memory drive 135 are detected in step 301 to be not only below a desired temperature range, but far below the desired temperature range, e.g., more than 10° C. below a minimum operating temperature. This is because wear caused by P/E cycles is a function of temperature, and writing a small amount of data at very low temperatures causes disproportionate wear to memory cells in flash memory device 135.

As noted previously, at higher temperatures, data retention in the memory cells of flash memory device 135 can be compromised. For example, at temperatures greater than 100° C., data retention in NAND-type memory cells may be reduced from years to only hours or minutes. Consequently, in situations in which a hybrid drive reaches such high temperatures, the solid-state memory device contained therein generally should not be considered a reliable non-volatile data storage medium. According to some embodiments, data retention in a flash memory device is improved by implementing measures that reduce the likelihood of dirty data stored in the flash memory from being unexpectedly lost or that modulate how much heat is generated in the hybrid drive. Furthermore, measures for modulating heat generated in the hybrid drive can also be used to minimize operation of the hybrid drive at undesirably low temperatures. Such embodiments are described below in conjunction with FIG. 4.

Figure 4:
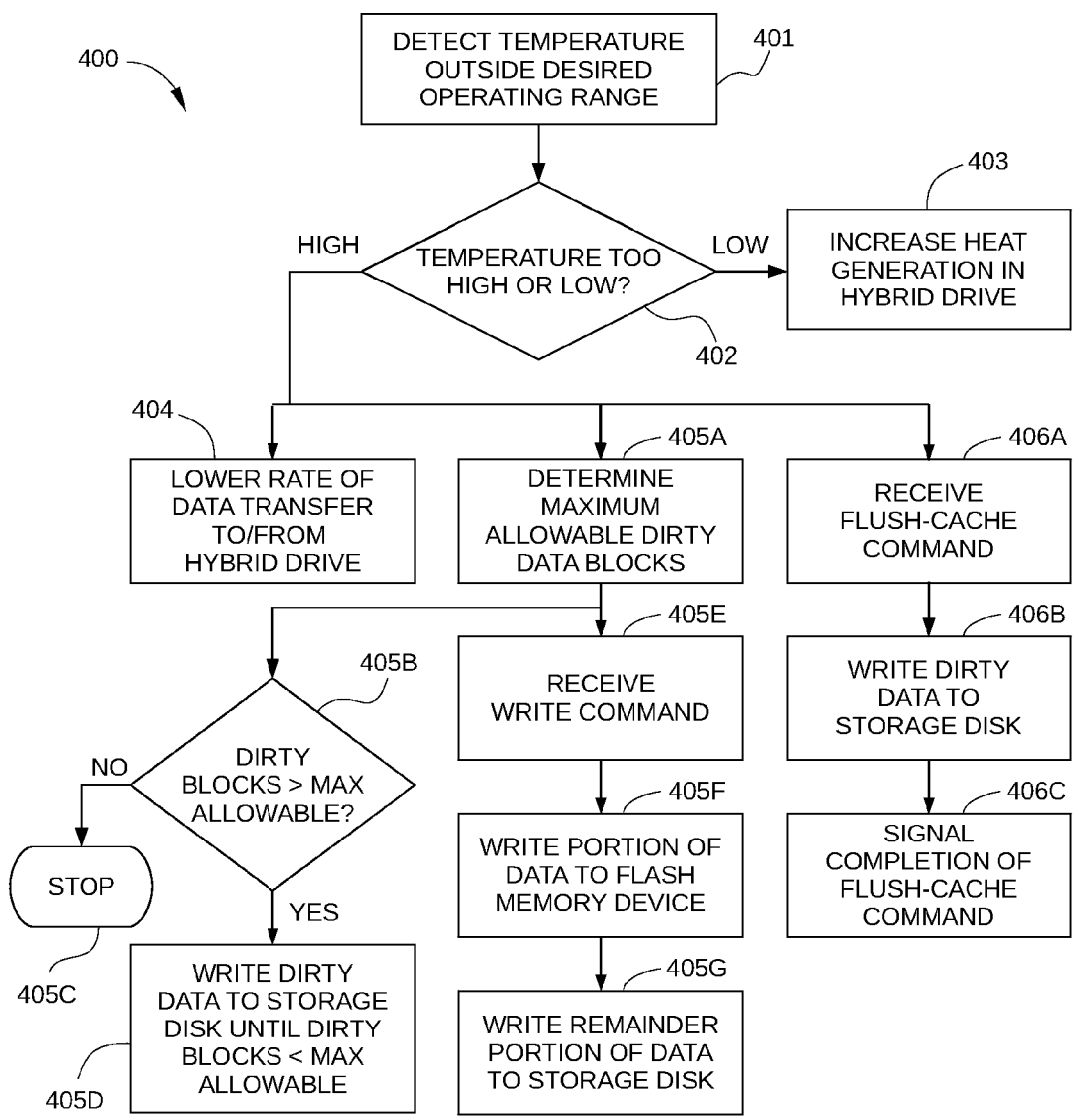
FIG. 4 sets forth a flowchart of method steps for storing data in a data storage device that includes a magnetic drive and a non-volatile solid-state drive, according to one or more embodiments.

FIG. 4 sets forth a flowchart of method steps for storing data in a data storage device, such as hybrid drive 100, that includes a magnetic storage medium and a non-volatile solid-state device, according to one or more embodiments. Although the method steps are described in conjunction with hybrid drive 100 in FIGS. 1 and 2, persons skilled in the art will understand that method 400 may be performed with other types of systems. The control algorithms for method 400 may reside in and/or be performed by controller 133, flash manager device 136, host 10, or any other suitable control circuit or system.

As shown, method 400 begins at step 401, where controller 133 or other suitable control circuit or system detects a temperature of hybrid drive 100 that is outside a predetermined normal operating temperature range for hybrid drive 100. Various embodiments of temperature detection suitable for use in step 401 are described above in step 301 of method 300.

In step 402, the determination is made whether the temperature detected in step 401 is greater than a predetermined maximum desirable operating temperature for hybrid drive 100 or less than a predetermined minimum desirable operating temperature for hybrid drive 100. As shown, if the temperature detected in step 401 is less than the predetermined minimum desirable operating temperature, method 400 proceeds to step 403. Conversely, if the temperature detected in step 401 is greater than the predetermined maximum desirable operating temperature, method 400 proceeds to one or more of steps 404, 405A, or 406A.

In step 403, controller 133 or other suitable control circuit or system, in response to the determination in step 402, causes hybrid drive 100 to perform one or more operations that increase heat generation of hybrid drive 100. In this way, flash memory device 135 or hybrid drive 100 as a whole can be increased in temperature, thereby reducing wear on flash memory device 135 caused by writing data thereto. The heat-generating operations in step 403 may be performed by flash memory device 135 and/or actuator arm assembly 120.

For example, in some embodiments, a rate of data transfer to the data storage device can be changed or dummy operations performed to increase the rate of heat generation by hybrid drive 100 and/or flash memory device 135. Specifically, in some embodiments, a series of read and/or write operations are performed on flash memory 135, since such flash-memory operations are a significant source of heat generation in hybrid drive 100. In some embodiments, such operations are "dummy" operations in which data is read from and/or written into flash memory device 135 independently from actual read and write commands issued by host 10 or controller 133. In other words, data read from flash memory device 135 in step 403 are not necessarily provided to host 10, and data written to flash memory device 135 are not necessarily received from host 10. In some embodiments, the above-described dummy write operations are performed on one or more sacrificial memory blocks in flash memory device 135 that are not intended for saving data and/or on inoperable memory blocks, such as worn-out or non-functional memory blocks in flash memory device 135. Because the above-described dummy read and/or write operations can be performed substantially continuously, the temperature of flash memory device 135 can be increased quickly. In yet other embodiments, one or more heating elements 129 that are included in flash memory device 135 may be used to heat up flash memory device 135 in step 403 by being activated when the temperature of hybrid drive 100 and/or flash memory device 135 is less than a predetermined minimum desirable operating temperature. Heating elements 129 may be used in lieu of or in addition to sacrificial memory blocks.

In another example, repeated seek operations can be performed by hybrid drive 100 using actuator arm assembly 120 to generate heat in hybrid drive 100. Seek operations are generally another significant source of heat in hybrid drive 100, and can therefore be used to quickly raise the temperature of hybrid drive 100 to a desired operating temperature. In some embodiments, such seek operations may be similar to the dummy read operations described above. Specifically, controller 133 can cause actuator arm assembly 120 perform a large number of seeks at various locations on storage disk 110, even in the absence of read commands from host 10. In this way, a high rate of data transfer to storage disk 110 is simulated, thereby increasing heat generation in hybrid drive 100.

It is noted that step 403 may be performed in conjunction with the above-described method 300 in FIG. 3. For example, steps 302 and/or 303 may be performed in conjunction with 403 until such time that a detected temperature of hybrid drive 100 and/or flash memory drive 135 precludes the benefits of steps 302 and/or 303 in method 300.

In step 404, controller 133 or other suitable control circuit or system causes hybrid drive 100 to execute read and/or write commands to flash memory device 135 and/or storage disk 110 at a lower rate of data transfer than a normal rate of data transfer. For example, with respect to storage disk 110 operations, controller 133 can delay seeks on storage disk 110 for a predetermined time period so that less heat is generated by hybrid drive 100 and the temperature thereof is less likely to increase further. Alternatively, controller 133 can cause read and/or write operations to slow by inserting pauses of one or more revolutions of storage disk 110 after reading one of the concentric data storage tracks thereon. In some embodiments, such pauses are a function of temperature, so that at higher detected temperatures for hybrid drive 100 and/or flash memory device 135, controller 133 causes read and/or write operations to slow further by increasing the number of revolutions storage disk 110 rotates during which such operations are paused. With respect to flash memory device 135 operations, execution of read and/or write commands directed to flash memory device 135 can be paused to achieve a lower rate of data transfer to flash memory device 135, thereby reducing the rate of heat generation in hybrid drive 100.

In steps 405A-405G, controller 133 limits the quantity of dirty data (i.e., data stored in flash memory device 135 but not stored on storage disk 110) stored in hybrid drive 100. In some embodiments, steps 405A-405G are performed when hybrid drive 100 and/or flash memory device 135 are detected in step 401 to be at a temperature in an "intermediate" temperature range, i.e., a temperature greater than a predetermined maximum desired operating temperature, but less than a temperature at which immediate or very short-term loss of data stored on flash memory device 135 may occur. For example, suitable intermediate temperature ranges include 60° C. to 80° C., 70° C. to 90° C., 60° C. to 100° C., etc. In steps 405A-405G, controller 133 limits the quantity of dirty data, so that said dirty data can be quickly written to storage disk 110 if the temperature of hybrid drive 100 and/or flash memory device 135 reaches a very high temperature, such as a temperature greater than the intermediate temperature range.

In step 405A, controller 133 determines a maximum allowable number of memory blocks in flash memory device 135 that can store data that are not also stored on storage disk 110. In some embodiments, the maximum allowable number determined in step 405A has a constant value for any temperature of hybrid drive 100 and/or flash memory device 135 that is in the intermediate temperature range. In other embodiments, the maximum number determined in step 405A is a function of the temperature detected in step 401, so that as the detected temperature of hybrid drive 100 and/or flash memory device 135 increases, the maximum allowable number of data blocks determined in step 405A decreases.

In step 405B, controller 133 determines if the number of memory blocks in flash memory device 135 that currently store dirty data is greater than the maximum allowable number determined in step 405A. If not, method 400 proceeds to step 405C and no further action is taken with respect to memory blocks currently storing dirty data unless step 405A is performed again, such as when the temperature of hybrid drive 100 and/or flash memory device 135 increases. If flash memory device 135 includes more memory blocks storing dirty data than the maximum allowable number determined in step 405A, method 400 proceeds to step 405D.

In step 405D, controller 133 writes dirty data in flash memory device 135 to storage disk 110 until the number of memory blocks in flash memory device 135 storing dirty data is equal to or less than the maximum allowable number determined in step 405A.

In step 405E, controller 133 receives a write command, for example from host 10, after the maximum allowable number of blocks storing dirty data is determined in step 405A.

In step 405F, controller 133 causes data associated with the write command to be written to flash memory device 135 if the number of memory blocks in flash memory device 135 storing dirty data is less than the maximum allowable number of memory blocks determined in step 405A. Controller 133 continues to cause data associated with the write command to be written to flash memory device 135 until the number of memory blocks in flash memory device 135 storing dirty data equals the maximum allowable number of memory blocks determined in step 405A. If the number of memory blocks in flash memory device 135 storing dirty is greater than or equal to the maximum allowable number of memory blocks determined in step 405A, method 400 proceeds to step 405G and no data associated with the write command is written to flash memory device 135.

In step 405G, controller 133 causes the remaining portion of data associated with the write command to be written to storage disk 110. It is noted that when none of the data associated with the write command is written to flash memory device 135 in step 405F, said remaining portion of data includes essentially all data associated with the write command.

In steps 406A-406C, controller 133 delays signaling completion of a flush-cache command from host 10 until substantially all dirty data stored in flash memory device 135 is also written to storage disk 110. In this way, when flash memory device 135 is at a very high temperature and is no longer a dependable non-volatile memory medium, all data stored in hybrid drive 100 is written to disk whenever a flush-cache command is received.

In step 406A, controller 133 receives a flush-cache command from host 10. Ordinarily, upon receipt of a flush-cache command, controller 133 typically confirms that all data received by hybrid drive 100 is either stored on storage disk 110 or in flash memory device 135, and then signals completion of the flush-cache command to host 10. However, in steps 406A-406C, controller 133 confirms all data is written to storage disk 110 before signaling completion of the flush-cache command.

In step 406B, in response to the flush-cache command, controller 133 causes substantially all dirty data stored in flash memory device 135 to be written to storage disk 110.

In step 406C, upon completion of step 406B, controller 133 signals completion of the flush-cache command to host 10.

It is noted that different detected temperatures for hybrid drive 100 and/or flash memory device 135 may be used for different embodiments described herein. For example, step 404 may be performed when hybrid drive 100 and/or flash memory device 135 are at a temperature of 60° C. or higher, steps 405A-405G may be performed when hybrid drive 100 and/or flash memory device 135 are at a temperature of 70° C. or higher, and steps 406A-406C may only be performed when hybrid drive 100 and/or flash memory device 135 are at a temperature of 80° C. or higher.

In sum, embodiments described herein provide systems and methods for storing data in a hybrid drive using a temperature-defined data-storage policy. According to this policy, the drive performs operations for advantageously modulating the temperature of the drive, minimizing increased wear on memory cells in the non-volatile solid-state device, and/or preventing data stored in the non-volatile solid-state device from being lost.

While the foregoing is directed to embodiments of the present invention, other and further embodiments of the invention may be devised without departing from the basic scope thereof, and the scope thereof is determined by the claims that follow.

We claim:

1. A data storage device, comprising:
a magnetic storage medium;
a non-volatile solid-state device; and
a controller configured to:
detect a temperature of the data storage device that is greater than a predetermined temperature;
determine a maximum allowable number and an actual number of dirty memory blocks in the non-volatile solid-state device, wherein each dirty memory block in the non-volatile solid-state device stores data that are not also stored on the magnetic storage medium;
execute a write command by writing data associated with the write command to one of the non-volatile solid-state device and the magnetic storage medium, so that the actual number of dirty memory blocks in the non-volatile solid-state device is, after the writing, less than or equal to the maximum allowable number of memory blocks in the non-volatile solid-state device; and
if the actual number of dirty memory blocks in the non-volatile solid-state device is greater than the maximum allowable number of dirty memory blocks in the non-volatile solid-state device, copy a number of dirty memory blocks in the non-volatile solid-state device to the magnetic storage medium to decrease the actual number of dirty memory blocks in the non-volatile solid-state device.

2. The data storage device of claim 1, wherein the temperature of the data storage device comprises a temperature of the non-volatile solid-state device.

3. The data storage device of claim 1, wherein the controller is further configured to execute the write command by changing a rate of data transfer to the non-volatile solid-state device by executing write commands to the non-volatile solid-state device at a lower rate of data transfer to the non-volatile solid-state device than a normal rate of data transfer to the non-volatile solid-state device.

4. The data storage device of claim 3, wherein the controller is further configured to periodically pause execution of the write commands to the non-volatile solid-state device to achieve the lower rate of data transfer to the non-volatile solid-state device.

5. The data storage device of claim 1, wherein the controller is further configured to, when the detected temperature is greater than the predetermined temperature, execute a write command to the magnetic storage medium at a lower rate of data transfer to the magnetic storage medium than a normal rate of data transfer to the magnetic storage medium.

6. The data storage device of claim 1, wherein the maximum allowable number is a function of the temperature that is greater than the predetermined temperature.

7. The data storage device of claim 1, wherein the controller is further configured to:
  receive a flush-cache command;
  in response to the flush-cache command, write to the magnetic storage medium substantially all data stored in the dirty memory blocks in the non-volatile solid-state device; and
  upon completion of writing to the magnetic storage medium substantially all data stored in the dirty memory blocks in the non-volatile solid-state device, signal completion of the flush-cache command.

8. The data storage device of claim 1, wherein the controller carries out the copying until the actual number of dirty memory blocks in the non-volatile solid-state device is less than the maximum allowable number of dirty memory blocks in the non-volatile solid-state device.

\* \* \* \* \*